United States Patent [19]

Seidou

[11] Patent Number: 5,479,058
[45] Date of Patent: Dec. 26, 1995

[54] GEARED MOTOR

[76] Inventor: Yoshio Seidou, 101-13 Aokubo, Ueda-shi, Nagano-ken, Japan, 386-01

[21] Appl. No.: 229,523

[22] Filed: Apr. 19, 1994

[51] Int. Cl.$^6$ ..................................................... H02K 7/06
[52] U.S. Cl. ................................ 310/83; 310/82; 310/261
[58] Field of Search ................................... 310/80, 82, 83, 310/84, 261, 264, 265, 254

[56] References Cited

U.S. PATENT DOCUMENTS

| | | | |
|---|---|---|---|
| 1,089,181 | 3/1914 | Apple | 310/83 |
| 2,370,872 | 3/1945 | Miller et al. | 310/82 X |
| 3,147,425 | 9/1964 | Christoff | 310/82 X |
| 4,367,424 | 1/1983 | Presley | 310/82 |

Primary Examiner—Mark O. Budd
Attorney, Agent, or Firm—Lyon & Lyon

[57] ABSTRACT

A geared motor employing a brushless induction motor in nested arrangement, either concentrically inwardly or concentrically outwardly, with a gear reduction device employing two gear wheels, one with interior teeth and one with exterior teeth, said teeth being meshed together. The difference in the number of teeth is small relative to the total number of teeth of each gear wheel. One of the two gear wheels moves in an eccentric path, is free to rotate relative to the rotor but is driven thereby. The other gear is fixed relative to the housing. An output accommodating the eccentric movement of the free gear derives reduced rotational speed and torque from the system.

10 Claims, 2 Drawing Sheets

GEARED MOTOR

BACKGROUND OF THE INVENTION

The field of the present invention is motor driven speed reduction devices.

Motors with speed reduction devices for low speed and high torque applications have typically employed a combination of a motor with an output shaft protruding axially and a speed reduction device contained in its own case. A pinion gear is typically mounted to the shaft of the motor and is engaged with gearing inside the case. The appropriate ratio is achieved by changes in the ratio of gear teeth and in an increase or decrease in the number of gear wheels.

A conventional motor driven gear reduction mechanism is illustrated in FIG. 1. A cylindrical motor housing 1 mounts an inductive stator 2. Concentrically arranged inwardly of the stator 2 are permanent magnets 4 mounted to a rotor 5. The rotor 5 is rotatably mounted within the housing 1 by means of an output shaft 6. The output shaft 6 has a pinion gear 7 mounted at one end thereof outwardly of the housing 1.

The pinion gear 7 is engaged with a gear including gear wheels 8, 9 and 10. The gear wheels 8 and 9 are fixed on a common shaft 11. The gear wheel 10 is fixed on an output shaft 12. Thus, the motor provides torque to the gear reduction device which in turn, through the gear, provides a high torque reduced speed output through the shaft 12.

The structure supporting the motor and gear reduction device includes a motor housing wall 13 associated with the housing 1 and located between the motor and the speed reduction device. Bearings 14 through 17 mount the appropriate shafts as indicated in FIG. 1. The bearings are mounted in the motor housing 1, the motor housing wall 13, a housing 18 for the speed reduction device and a housing wall 19 for the speed reduction device positioned against the housing wall 13 of the motor housing.

The typical motor driven gear reduction device as illustrated in FIG. 1 has the ability to accomplish a large reduction ratio by increasing the number of gear wheels. However, the size of the unit is substantial and increases with desired reduction. The number of parts and the gearing losses increase by increasing the number of gears to achieve greater reduction. When the number of gear teeth is increased to achieve a larger reduction ratio, the size of the unit again increases. Thus, conventional construction provides constraints on compactness, weight, complexity and the like.

SUMMARY OF THE INVENTION

The present invention is directed to a geared motor to effect motor driven speed reduction in a compact and efficient manner.

In a first separate aspect of the present invention, a motor is concentrically arranged with a gear reduction device. The rotor includes an eccentric cylindrical surface to drive a speed reduction mechanism including a gear having two gear wheels, one being a ring gear with internal teeth and the other having external teeth and being located within the ring gear. The two gear wheels have different numbers of teeth.

In a further separate aspect of the present invention, the aforementioned geared motor has all of the eccentric surface, the ring gear having the interior teeth and the gear wheel nested with the stator and rotor of the motor so as to provide a thin profile.

In yet another separate aspect of the present invention, the gearing may be inwardly concentric or outwardly concentric in a nested arrangement with the motor.

Accordingly, it is an object of the present invention to provide an improved motor driven speed reduction mechanism. Other and further objects and advantages will appear hereinafter.

DETAILED DESCRIPTION OF THE PREFERRED EMBODIMENTS

Figure 1:
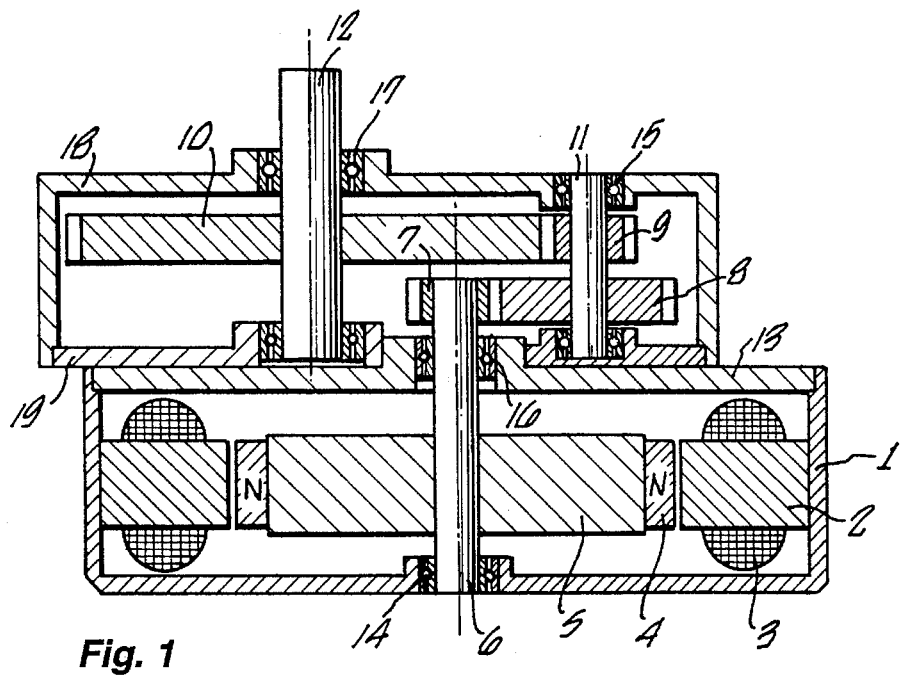
FIG. 1 is a cross-sectional plan view of a prior art speed reduction geared motor.

Turning in detail to the drawings, a motor including an inductive stator 21 is found inside a cylindrical motor housing 22. Inwardly of the inductive stator 21 are permanent magnets 23 associated with a rotor 24. A fixed air gap is arranged between the permanent magnets 23 and the inductive stator 21. Thus, a brushless motor is defined within the housing 22.

The rotor 24 includes an interior eccentric cylindrical surface. At the same time, the rotor 24 includes a concentrically arranged hub 24A through which the rotor 24 is rotatably mounted. Thus, the rotor is able to rotate and remain in a concentric arrangement with the inductive stator 21. At the same time, it provides an eccentric cylindrical surface which rotates about the axis of rotation of the rotor 24 with the axis of that cylindrical surface being displaced laterally from the axis of the rotor.

Located within the interior eccentric cylindrical surface is a speed reduction mechanism. A bearing 25 is arranged on the interior eccentric cylindrical surface for friction reduction. Mounted within the bearing is a first gear wheel 26 in the form of an annular gear wheel having interior gear teeth thereabout. This first gear wheel 26 is able to rotate freely within the bearing 25 concentrically with the eccentric cylindrical surface of the rotor 24.

Nested within the first gear wheel 26 is a second gear wheel 27. This second gear wheel has external gear teeth such that the first and second gear wheels mesh. The number of gear teeth on the first gear wheel is different than the number of teeth on the second gear wheel so as to achieve the desired speed reduction. The second gear wheel 27 is mounted on a shaft 36 which is fixed to the housing 22. The second gear wheel 27 is fixed to that shaft 36.

Thus, the inductive stator 21, the housing 22, the second gear wheel 27 and the shaft 36 are all fixed relative to one another. The rotor 24 rotates concentrically within the inductive stator 21 while the first gear wheel is constrained to move about the rotational axis of the rotor 24 while meshing with the fixed second gear wheel 27. The speed of rotation of the first gear wheel 26 is thus driven by the rotor 24 but is much smaller than the speed of rotation of the rotor 24.

Figure 2:
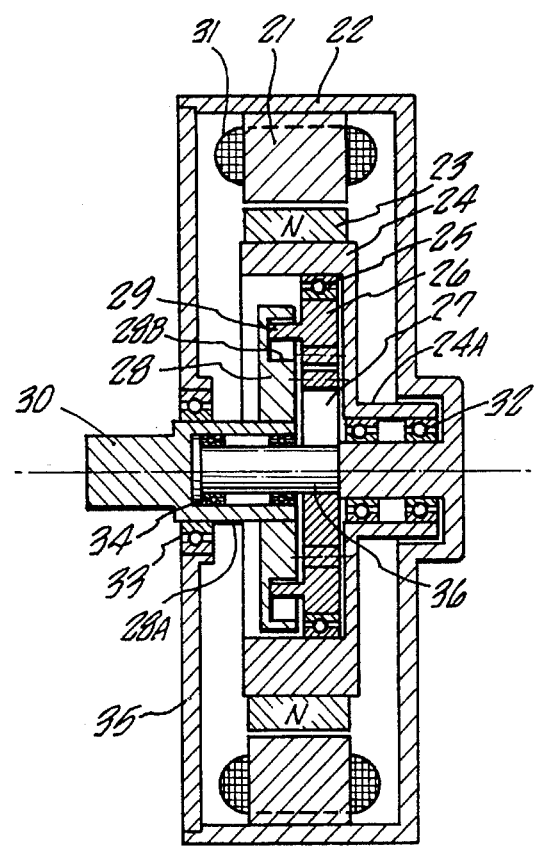
FIG. 2 is a cross-sectional plan view of a speed reduction geared motor in accordance with the present invention taken as a view along line A—A of FIG. 3.

To output the foregoing reduced speed, an output coupling 28 as best seen in FIG. 2 is rotatably mounted about a hub 28A associated with an output shaft 30. The output coupling 28 includes holes 28B to be associated with pins 29 located on the first gear wheel 26. The holes 28B are of sufficient size to accommodate the eccentric movement of the first gear wheel 26.

In operation, the rotor 24 is driven in relationship to the inductive stator 21 in a conventional manner. The arrangement of the interior eccentric cylindrical surface is such that it induces a form of orbiting of the planetary arrangement of the first gear wheel 26. With the first gear wheel 26 free to rotate relative to the eccentric cylindrical surface and constrained to be meshed with the stationery second gear wheel 27, the first gear wheel 26 advances slowly depending on the differential between the number of teeth on the meshed gearing. Thus, with one complete orbit of the first gear wheel 26, it is actually rotated relative to the second gear wheel 27 only by the differential in the number of teeth between the two gear wheels. Thus, the substantially reduced speed is achieved with increased torque.

Figure 3:
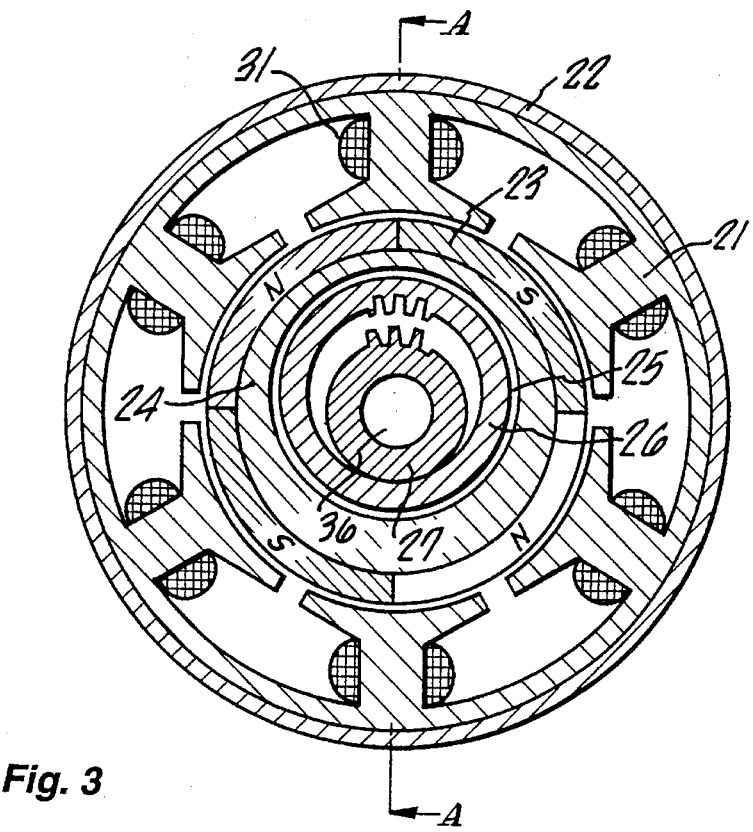
FIG. 3 is a cross-sectional side view of the motor of FIG. 2.

Looking more closely at FIGS. 2 and 3, the cylindrical shaped inductive stator 21 is shown fixed in the housing 22 and employs six magnet steel core poles. Wire 31 provides winding about the magnetic steel cores. A cylindrical shaped four-pole permanent magnet 23 is fixed to the rotor 24. The rotor 24 includes the centrally arranged hub 24A which is rotatably supported on a bearing 32. The bearing 32 is in turn supported on the shaft 36 fixed relative to the housing 22.

The first gear wheel 26 with interiorly arranged gear teeth includes six bosses or pins 29 concentrically arranged and extending parallel to the axis from one end of the gear wheel. The holes 28B are also arranged concentrically about the output coupling 28 and have a sufficient size to accommodate the eccentric movement of the pins 29. Bearings 34 mount the hub 28A on the fixed shaft 36 while the hub 28A is also mounted within the bearing 33 associated with the wall 35 of the housing 22.

The windings 31 are arranged in three phase to provide a rotating magnetic field induced in the inductive stator 21. The action of the rotating field on the permanent magnet 23 drives the rotor 24. This motion is transferred through the bearing 25 to the eccentrically mounted first gear wheel 26 having the internal teeth. In attempting to move with the rotor 24, the gear teeth of the first gear wheel 26 constrain the motion because of the fixed gear 27. Thus, eccentric oscillation is induced without the same rotational movement as the rotor 24. The six pins 29 and six associated holes 28B then cooperate to transfer the reduced rotational speed and torque of the first gear wheel 26 to the output shaft 30. With the size of the holes 28B slightly larger than the offset of the first gear wheel 26, eccentric oscillation of the gear 26 is not prevented. Thus, power and rotational speed is transmitted to the output shaft.

The speed reduction ratio may be taken as the difference in the number of teeth between the gear wheels 26 and 27 divided by the number of teeth in the fixed gear wheel 27. As an example, if the number of teeth on the gear wheel 26 is 60 and the number of teeth for the gear wheel 27 is 59, the speed reduction ratio would be calculated as 1/60.

Figure 4:
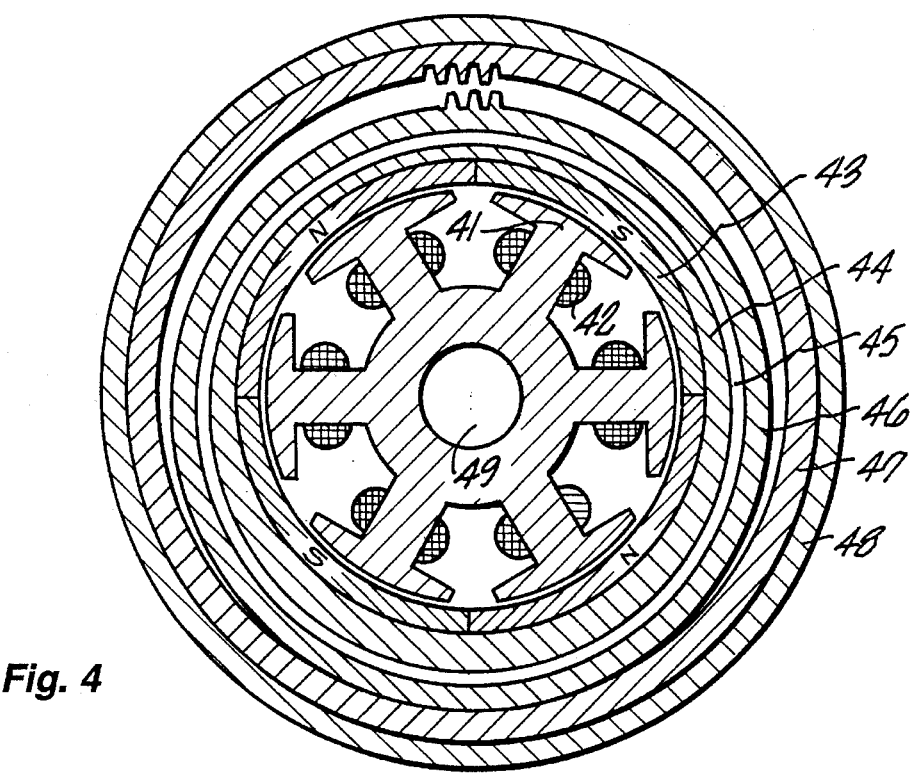
FIG. 4 is an alternate embodiment shown as a cross-sectional side view as in FIG. 3.

FIG. 4 illustrates an alternative configuration where the motor is positioned concentrically inwardly rather than concentrically outwardly of the gearing. In FIG. 4, the stator 41 is located inwardly on a fixed shaft 49. Windings 42 generate the appropriate rotating field in the inductive stator 41. A cylindrical shaped four-pole permanent magnet 43 is concentrically positioned around the stator 41 associated with a rotor 44 which is rotatably supported by the housing 48 which, with the shaft 49 is similarly constructed to the housing of the first embodiment. The rotor 44 has an external eccentric cylindrical surface to operate through a bearing 45 to mount a first gear wheel 46 having external teeth. A fixed second gear wheel 47 is a ring gear with internally arranged gear teeth which mesh with the gear teeth of the first gear wheel 46. An output coupling (not shown) would attach to the first gear wheel 46 as in the first embodiment.

Thus, as the three phase magnetic field is induced in the stator 41, the rotor 44 is driven. This eccentrically moves the first gear wheel 46 which is free to rotate relative to the rotor 44. The engagement of the gear teeth of the first gear wheel 46 and the second gear wheel 47 then create a rotational motion which is related to the difference in the number of teeth between the two meshed gear wheels. The output motion may be reversed to that of the rotor depending on the relative number of teeth.

In the embodiments, only two gear wheels are employed with a very significant gear reduction. These arrangements are effected with a nesting arrangement with a motor. Thus, a compact device is available with a small number of parts and significant efficiency for providing a geared motor with a significant speed reduction output. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A geared motor comprising a stator;

a rotor rotatably mounted relative to said stator and positioned concentrically with said stator, said rotor and said stator defining an electric motor, said rotor including an eccentric cylindrical surface;

a first gear wheel rotatably mounted on said eccentric cylindrical surface;

a second gear wheel fixed relative to said stator and engaging said first gear wheel, said first gear wheel and said second gear wheel having different numbers of teeth;

an output coupling rotatably mounted relative to said stator and coupled with said first gear wheel to rotate therewith.

2. The geared motor of claim 1, said first gear wheel being an annular gear wheel with internal gear teeth, said second gear wheel having external gear teeth and being located within said first gear wheel.

3. The geared motor of claim 2, said cylindrical surface being an annular interior surface having an axis displaced laterally from the axis of rotational mounting of said rotor.

4. The geared motor of claim 3 further comprising a housing;

a shaft centrally mounted through said housing, said rotor and said output coupling being rotatably mounted to said shaft and said second gear being fixed to said shaft, said shaft being concentric with said stator.

5. The geared motor of claim 1, said second gear wheel being an annular gear wheel with internal gear teeth, said first gear wheel having external gear teeth and being located within said second gear wheel.

6. The geared motor of claim 5, said cylindrical surface being an exterior surface having an axis displaced laterally from the axis of rotational mounting of said rotor.

7. The geared motor of claim 1 further comprising
a bearing between said first gear and said cylindrical surface of said rotor.

8. The geared motor of claim 1, one of said output coupling and said first gear wheel having pins and the other of said output coupling and said first gear wheel having holes to receive said pins, said holes being larger than said pins to accommodate eccentric movement of said first gear wheel relative to said coupling.

9. The geared motor of claim 1, said stator including a plurality of inductive stator elements and said rotor including a plurality of permanent magnets.

10. A geared motor comprising
a housing;
a shaft centrally mounted through said housing;
a stator fixed relative to said housing concentric with said shaft;
a rotor rotatably mounted relative to said stator on said shaft and positioned concentrically with said stator, said rotor and said stator defining an electric motor, said rotor including an eccentric cylindrical internal surface having an axis displaced laterally from the axis of rotational mounting of said rotor;
a first annular gear wheel having internal gear teeth and being rotatably mounted on said eccentric cylindrical surface;
a second gear wheel having external gear teeth, being fixed relative to said stator on said shaft, being located within said first gear wheel and engaging said first gear wheel, said first gear wheel and said second gear wheel having different numbers of teeth;
an output coupling rotatably mounted relative to said stator on said shaft and coupled with said first gear wheel to rotate therewith, one of said coupling and said first gear wheel having pins and the other of said coupling and said first gear wheel having holes to receive said pins, said holes being larger than said pins to accommodate eccentric movement of said first gear wheel relative to said coupling.

* * * * *